United States Patent [19]
Balster et al.

[11] Patent Number: 5,818,658
[45] Date of Patent: Oct. 6, 1998

[54] VARIABLE PNEUMATIC LOADER FOR TESTING A DISK DRIVE HEAD GIMBAL ASSEMBLY

[75] Inventors: Charles Balster; Donald Wanek; Steven Loth, all of Rochester, Minn.

[73] Assignee: Phase Metrics, San Diego, Calif.

[21] Appl. No.: 919,762

[22] Filed: Aug. 28, 1997

Related U.S. Application Data

[63] Continuation of Ser. No. 571,344, Dec. 12, 1995, abandoned.

[51] Int. Cl.$^6$ .................................................... G11B 21/12
[52] U.S. Cl. .............................................. 360/75; 360/103
[58] Field of Search ........................................ 360/75, 103

[56] References Cited

U.S. PATENT DOCUMENTS 5,390,059  2/1995  Tokuyama et al. .................. 360/103 X

FOREIGN PATENT DOCUMENTS

| 58-94163 | 6/1983 | Japan | 360/75 C |
| 59-178649 | 10/1984 | Japan | 360/75 C |
| 63-61479 | 3/1988 | Japan | 360/75 G |
| 3-76073 | 4/1991 | Japan | 360/75 C |
| 3-283151 | 12/1991 | Japan | 360/75 N |
| 4-87080 | 3/1992 | Japan | 360/75 G |

*Primary Examiner*—Aristotelis M. Psitos
*Assistant Examiner*—James L. Habermehl
*Attorney, Agent, or Firm*—Blakely Sokoloff Taylor & Zafman

[57] ABSTRACT

An HGA loader which utilizes sub-ambient air pressure to move a magnetic head of the HGA relative to a test surface. The HGA is mounted to a clamp and located adjacent to a nozzle. The nozzle draws in air through an orifice to create a sub-ambient pressure region below the suspension. Ambient air pressure will flow into the sub-ambient void created by the nozzle located below the suspension beam of tge HGA. The air flow will move the suspension beam away from the disk surface and unload the HGA. The level of the sub-ambient pressure and the separation between the head and disk can be varied by a computer controlled regulator valve. The loader can be used in a flying height tester where calibration is obtained by taking optical data while varying the flying height by changing the sub-ambient pressure. The sub-ambient pressure created by the orifice causes the HGA to bend about its natural pivot point or the bend radius of the suspension or load beam. In doing so, the loader does not create an additional slider angle during a test procedure nor does it introduce any mechanical sliding motion which could generate debris.

11 Claims, 1 Drawing Sheet

VARIABLE PNEUMATIC LOADER FOR TESTING A DISK DRIVE HEAD GIMBAL ASSEMBLY

This is a continuation application of application Ser. No. 08/571,344, filed Dec. 12, 1995, now abandoned.

BACKGROUND OF THE INVENTION

1. Field of the Invention

The present invention relates to a test loader for loading a head gimbal assembly of a hard disk drive adjacent to a test surface.

2. Description of Related Art

Hard disk drives contain magnetic heads that magnetize and sense the magnetic field of a rotating disk. The head is typically mounted to a suspension arm that is cantilevered from an actuator arm. The actuator arm includes a voice coil motor that moves the heads across the disk. Each magnetic head is integrated into a slider which has aerodynamic features that create an air bearing between the disk and the head when the disk is spinning. The slider, gimbal, load beam, and base plate are commonly referred to as a head gimbal assembly (HGA).

Maintaining an air bearing height that is within manufacturing tolerances is critical to the operation of the disk drive. A flying height that is too large may degrade the electrical performance of the head. A flying height that is too small may cause undesirable contact between the head and the disk. The flying height is a function of the mechanical characteristics of each HGA. To insure compliance with the recommended flying height tolerances, the HGAs of mass produced disk drives are typically tested before being assembled to the actuator arms.

Flying height testers typically contain a loader that captures an HGA and moves the head adjacent to a transparent disk. The disk is spun and the air bearing height is measured with an optical system such as an interferometer. Because of the different optical properties of each slider, the optical system must be calibrated for each HGA that is tested. Calibration is typically performed by moving the head between flying heights and analyzing data measured by the optical system.

Some prior art flying height testers move the head with a mechanical blade that is located between the HGA and the disk. For HGAs that fly with small air bearings the potential mechanical interference created by the blade makes such a loader impractical. Other types of testers include pivot point loaders which rotate the HGA between two positions. It has been found that prior art pivot point loaders introduce an undesirable angle between the slider and the disk. Depending on the location of the pivot point, the slider will translate, rendering any calibration done during this movement false. The additional slider angle may cause the head to crash into the disk. It would be desirable to provide a flying height tester loader which allows the head to fly at any height and which does not introduce an undesirable slider angle.

SUMMARY OF THE INVENTION

The present invention is an HGA loader which utilizes sub-ambient air pressure to move a magnetic head of the HGA relative to a test surface. The HGA is mounted to a clamp and located adjacent to a nozzle. The nozzle draws in air through an orifice to create a sub-ambient pressure region below the suspension. Ambient air pressure will flow into the sub-ambient void created by the nozzle located below the suspension beam of the HGA. The air flow will move the suspension beam away from the disk surface and unload the HGA. The level of the sub-ambient pressure and the separation between the head and disk can be varied by a computer controlled regulator valve. The loader can be used in a flying height tester where calibration is obtained by taking optical data while varying the flying height by changing the sub-ambient pressure. The sub-ambient pressure created by the orifice causes the HGA to bend about its natural pivot point or the bend radius of the suspension or load beam. In doing so, the loader does not create an additional slider angle during a test procedure nor does it introduce any mechanical sliding motion which could generate debris.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
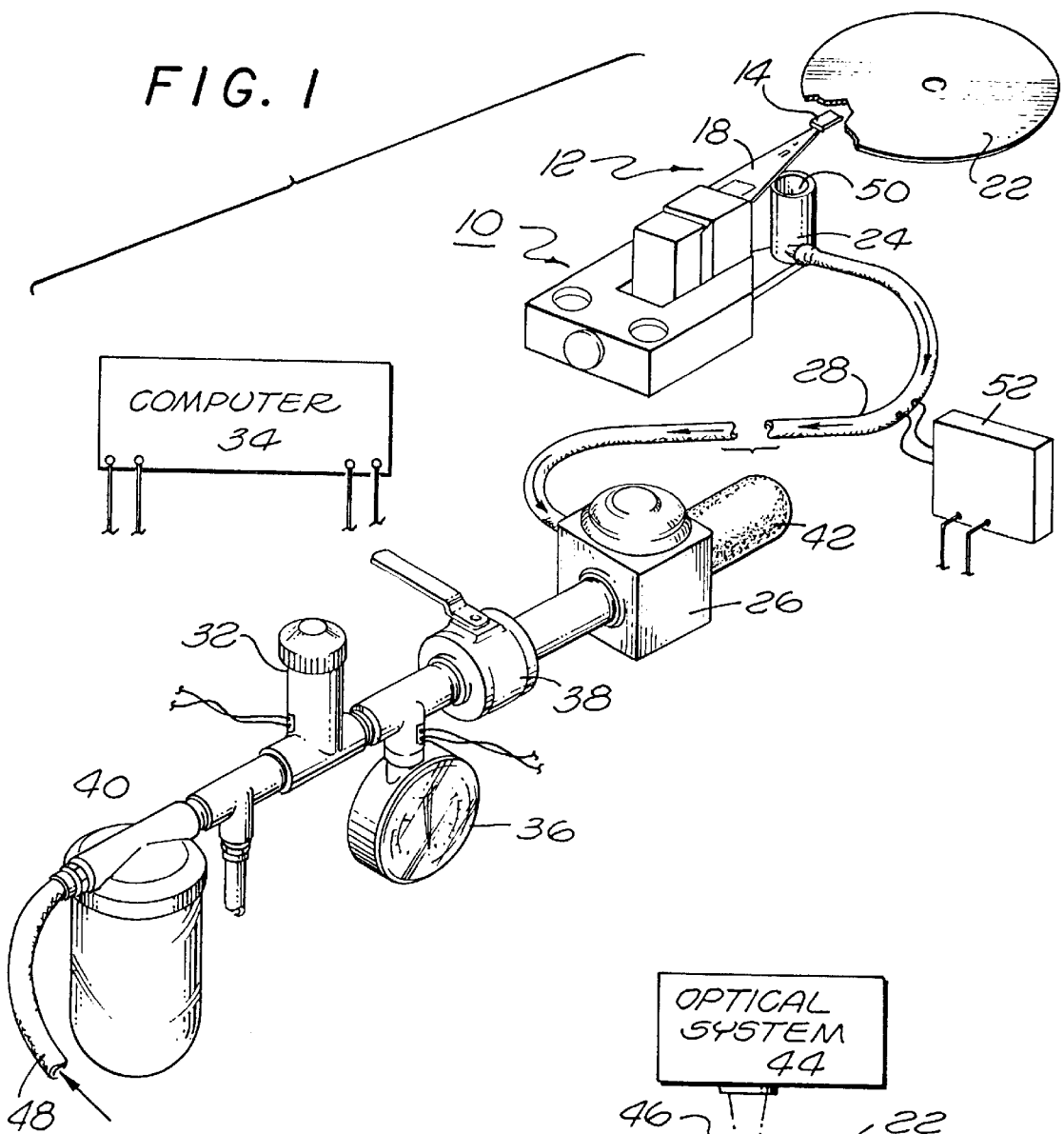
FIG. 1 is a perspective view of a tester with a loader of the present invention.
Figure 2:
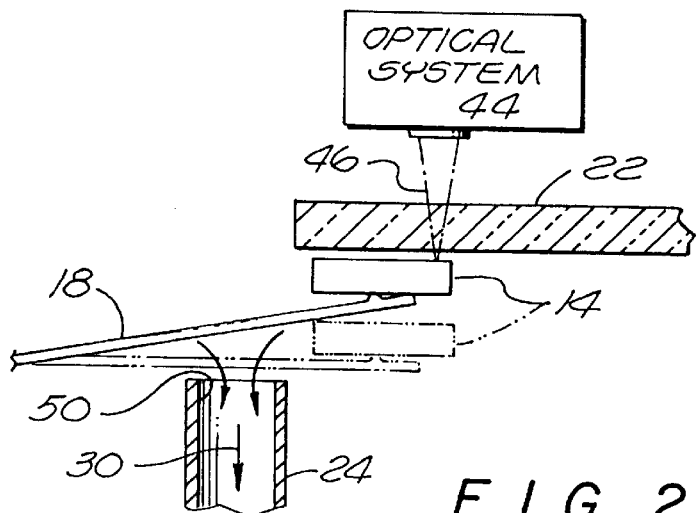
FIG. 2 is a side view showing a head gimbal assembly being varied by the loader.

Referring to the drawings more particularly by reference numbers, FIGS. 1 and 2 show a schematic representation of a loader of the present invention that is typically located within a tester. The tester typically test various characteristics of a head gimbal assembly (HGA). The loader includes a clamp assembly 10 that is located within the tester, and which holds a HGA 12. The HGA 12 includes a magnetic head or slider 14 that is mounted onto a gimbal (not shown). The gimbal is mounted to a suspension or load beam 18 that is mounted to a base plate. The gimbal may be an integral part of the suspension/load beam, wherein the slider 14 is mounted directly to the integral gimbal of the suspension beam 18.

The HGA 12 is mounted onto the clamp assembly 10 by an operator of the tester. The clamp assembly 10 is typically coupled to an automated mechanism (not shown) which moves the assembly 10 so that the HGA 12 is underneath a disk 22. The flying height between the slider 14 and the disk 22 is measured while it remains under the disk 22. After testing, the clamp assembly 10 is retracted away from the disk 22 so that the operator can replace the HGA 12 with another part.

Located adjacent to the HGA 12 is a nozzle 24. The nozzle 24 is coupled to a system which induces a flow of air 30 through an orifice 50 as indicated by the arrows shown in FIG. 2. The orifice 50 is the opening to the nozzle. The size and shape of the orifice 50 can be optimized for different HGAs 12. A vacuum pump 26 is attached to an air line 28 that is connected to the nozzle 24. The pump 26 draws air from beneath the suspension arm 18 through the orifice 50 and into the nozzle 24. The air flow creates a sub-ambient condition on the underside of the suspension arm 18. Ambient air moves around the suspension arm and toward the sub-ambient void. The flow of air pushes the entire HGA down to the tip of the nozzle 24. Although a vacuum pump 26 is described, it is to be understood that the system may include some other means of drawing a vacuum through the air line 28 and the nozzle 24, or any other device that creates a sub-ambient pressure adjacent to the suspension beam 18.

The flow of air through the air line 28 and nozzle 24 is controlled by a regulator valve 32. The regulator valve 32 can control the sub-ambient pressure within the line 28 and the level of the sub-ambient pressure within the nozzle 24. In the preferred embodiment, the regulator valve 32 contains a solenoid (not shown) that receives control signals from a computer 34. The valve 32 may vary the sub-ambient pressure of the nozzle 24 in accordance with control signals from the computer 34. The system may have a pressure gauge 36 that is coupled to the regulator valve 32 for primary feed-back to the operator. The amount of air flow through the vacuum pump and sub-ambient pressure created in line 28 can be determined by the amount of air pressure being applied to the vacuum pump. The pressure gauge 36 is an aid in the manual operation of the loader.

The computer 34 may contain a feedback algorithm which changes the valve 32 air pressure until a vacuum sensor 52, which measures the level of vacuum within the air line 28, reaches a desired level. The vacuum sensor 52 can also function as a fail safe in that if the desired level is not attained, the mechanism shuts down and signals the operator of an unsafe condition. The system may further have a check valve 38 to terminate air flow, a filter 40 to filter the air drawn into the test area, and a muffler 42 that reduces the noise of the pump 26.

FIG. 2 shows the head 14 being moved by the sub-ambient pressure created within the nozzle 24. The sub-ambient pressure creates an air flow that bends the suspension arm 18 and moves the head 14 away from the disk 22. The suspension arm 18 has a counteracting spring force that biases the head back to the static position. The head 14 will therefore move back to the original position when the sub-ambient pressure is terminated. In the preferred embodiment, the inner diameter of the nozzle opening orifice 50 is larger than the width of the portion of the suspension arm 18 that is immediately above the orifice. The oversized nozzle opening 50 insures that air flows around the arm 18 and into the nozzle opening 50. In the preferred embodiment, the nozzle 24 is located 0.050' below the suspension arm 18. The air line 48 has a pressure ranging between 0–80 psi to create a sub-ambient pressure in line 28 and nozzle 24.

The pull force of the sub-ambient pressure bends the suspension arm 18 at the same pivot axis about which the arm 18 is design to bend in an actual hard disk drive. By bending the HGA about the pivot axis of the arm 18, the loader of the present invention does not introduce an undesirable angle between the slider 14 and the disk 22. The loader will therefore not crash the HGA in the manner typically found in prior art HGA testers.

Additionally, some flying sliders 14 create negative pressures that pull the head 14 toward the disk 22. The force of the negative pressure pockets counteract the pull force of mechanical loaders. This counteractive force may over stress the gimbal and damage the HGA. It has been found that the sub-ambient pressure nozzle of the present invention can unload a flying negative pressure slider without damaging the HGA. It is believed that the sub-ambient air flow induced by the nozzle interrupts the negative air pockets and reduces, or eliminates, the counteractive pull force.

The flying height between the head 14 and the disk 22 is measured with an optical system 44. The disk 22 is typically constructed from a transparent material which allows a light beam 46 to be reflected from the disk/head interface. The optical system 44 detects a change in state of the reflected beam to determine the actual height of the air bearing between the head 14 and the disk 22. Because the reflective properties of the slider 16 may vary between HGAs, the optical system 44 must be calibrated for each HGA tested. When the HGA is loaded, the computer 34 issues a command to the regulator valve 32 to vary the negative pressure and move the head away from the disk 22 to a second height. The optical system 44 obtains data while the head is moving to calibrate the system 44.

In operation, the test operator loads an HGA 12 onto the clamping assembly 10. The operator may then depress an input button (not shown) that provides an input signal to the computer 34 to initiate a test routine. The computer 34 preferably provides control signals to the regulator valve 32 to create a negative pressure within the nozzle 24 and move the head 14 down into an unload condition. An unload condition is when a HGA is pulled or pushed down to the nozzle. In this state, the HGA can safely be moved under a disk or test surface. After the conditions are met, the HGA is "loaded" on to the test surface by turning off the air flow thereby allowing the slider to "fly". The HGA can then be tested. After the HGA is tested, the head 14 is pulled away from the disk 22 by creating a negative pressure in the nozzle 24. The clamping assembly 10 is then retracted to the original position, wherein the operator can replace the HGA with another part and repeat the process. Although a flying height tester is described, the loader of the present invention can be used in electrical testers, disk certifiers and glide burnish test gram load testers or any test system which must load and unload a HGA.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A loader for testing a head that is located adjacent to a disk, wherein the head is mounted to a load beam, comprising:
    a source of sub-ambient pressure that creates a sub-ambient pressure adjacent to said load beam to move the load beam and head relative to the disk; and,
    a control system that varies and controls a level of the sub-ambient pressure to vary the movement of the load beam and the head so that the head moves to at least three positions.

2. The loader as recited in claim 1, further comprising a nozzle that is coupled to said source of sub-ambient pressure and located adjacent to the load beam.

3. The loader as recited in claim 2, wherein said nozzle has an inner diameter orifice that is larger than a width of the load beam so that air flows around the load beam.

4. The loader as recited in claim 2, wherein said control system includes a solenoid control valve that controls the sub-ambient pressure and which is controlled by a computer.

5. The loader as recited in claim 2, wherein said source of sub-ambient pressure includes a pump.

6. The loader as recited in claim 2, further comprising an optical system that measures the height of an air bearing that separates the head from the disk.

7. A loader for testing a head that is located adjacent to a disk, wherein the head is mounted to a load beam, comprising:

a source of sub-ambient pressure that creates a sub-ambient pressure and a corresponding air flow; and, a nozzle that is coupled to said source of sub-ambient pressure and located adjacent to the load beam so that the air flows into an orifice of said nozzle to move the load beam said orifice being larger than a width of the load beam so that the air flows around the load beam.

8. The loader as recited in claim 7, further comprising a solenoid controlled valve that controls the sub-ambient pressure and which is controlled by a computer.

9. The loader as recited in claim 7, wherein said source of sub-ambient pressure includes a pump.

10. The loader as recited in claim 7, further comprising optical means for measuring the height of an air bearing that separates the head from the disk.

11. A method for varying a height of an air bearing that separates a head from a disk, wherein the head is mounted to a load beam, comprising the steps of:

a) spinning the disk to create an air bearing between the head and the disk, wherein the air bearing has a height; and, b) creating a sub-ambient pressure adjacent to the load beam to move the head relative to the disk to a first position;

c) varying the sub-ambient pressure and the movement of the head to a second position: and, d) varying the sub-ambient pressure and the movement of the head to a third position.

* * * * *